United States Patent
Lanus et al.

(10) Patent No.: US 6,374,340 B1
(45) Date of Patent: Apr. 16, 2002

(54) METHOD OF MANAGING MEMORY FOR A PCI BUS

(75) Inventors: Mark S. Lanus, Tempe; Mark P. Huth, Glendale, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/497,561

(22) Filed: Apr. 14, 2000

(51) Int. Cl.[7] .............................................. G06F 13/00
(52) U.S. Cl. ........................ 711/173; 707/102; 707/205
(58) Field of Search .......................... 711/173; 707/102, 707/205

(56) References Cited

U.S. PATENT DOCUMENTS 5,561,786 A * 10/1996 Morse ........................ 711/170

OTHER PUBLICATIONS

Goncharsky et al., Use of Binary Trees for Storage Allocation, IBM Technical Disclosure Bulletin, vol. 24, No. 6, Nov. 1981, pp. 2710–2712.*

Goncharsky et al., Use of a Binary Tree for Storage De-allocation, IBM Technical Disclosure Bulletin, vol. 24, No. 6, Nov. 1981, p. 2713.*

* cited by examiner

*Primary Examiner*—David L. Robertson
(74) *Attorney, Agent, or Firm*—S. Kevin Pickens; Kevin D. Wills

(57) ABSTRACT

A method of managing memory includes providing a memory (190) partitioned into a memory tree having N memory levels and different numbers of memory nodes (100, 110, 111, 120, 121, 122, 123, 130, 131, 132, 133, 134, 135, 136, 137) at each of the memory levels, providing a memory request, determining a memory request size, recursively searching partially-full subtrees within the memory tree to identify an empty one of the memory nodes minimizing fragmentation within the memory tree, and allocating the memory request to the empty one of the memory nodes.

26 Claims, 4 Drawing Sheets

METHOD OF MANAGING MEMORY FOR A PCI BUS

FIELD OF THE INVENTION

This invention relates, in general, to memory management, and more particularly to a method of managing memory or I/O resources for a Peripheral Component Interface (PCI) bus.

BACKGROUND OF THE INVENTION

In a bus-based computer system, component boards of the computer system communicate with each other through shared memory or mapped memory. Early bus-based computer systems used fixed memory allocation, which was configured by manually setting jumpers or switches on the component boards. However, this manual configuration produced many errors. Modern bus-based computer systems use a Peripheral Component Interface (PCI) bus that automatically maps memory to the component boards when the computer system is booted-up or turned on. Recently, this automatic memory mapping process has been extended to occur as a result of PCI "hot-plug" or "hot-swap" events. Current implementations of this extension use a fixed resource allocation for each pluggable site. Fixed allocations impose severe restrictions on the system.

Accordingly, a need exists for a method of efficiently managing memory for a PCI bus without re-booting the computer system. It is desired for the memory management method to be compatible with different component boards requiring different sized allocations of memory. It is also desired for the memory management method to minimize down time for the computer system so that the system will no longer need to be taken off-line to upgrade, service, or repair different components of the computer system. It is further desired for the memory management method to avoid aging problems, such as the exhaustion of system resources due to memory leaks or fragmentation. Other memory management methods using fixed memory mapping techniques, best fit techniques, best fit with memory compaction techniques, or buddy buffer techniques do not minimize down time for the computer system, do not avoid aging of computer system resources, or do not accommodate computer architecture changes.

BRIEF DESCRIPTION OF THE DRAWINGS

The present invention will be better understood from a reading of the following detailed description, taken in conjunction with the accompanying drawing figures in which.

Figure 1:
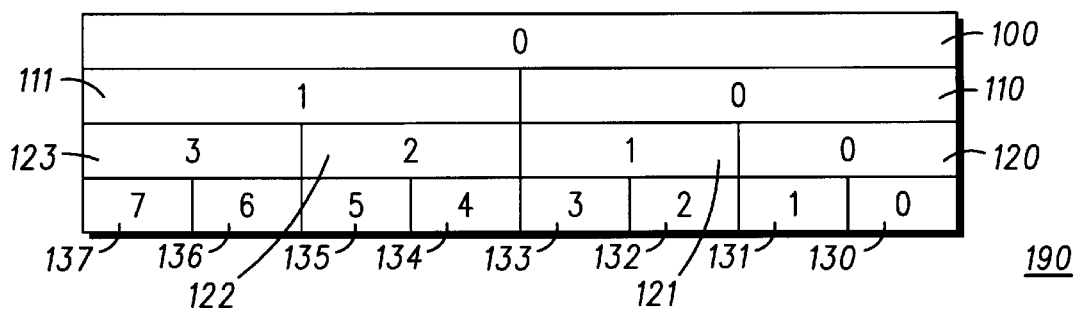
FIG. 1 illustrates a memory tree with partition indices in accordance with an embodiment of the present invention.

For simplicity and clarity of illustration, the same reference numerals in different figures denote the same elements, and descriptions and details of well-known features and techniques are omitted to avoid unnecessarily obscuring the present invention. Furthermore, the terms left, right, and the like in the description and in the claims, if any, are used for descriptive purposes. However, it is understood that the embodiments of the invention described herein are capable of operation in other configurations than described or illustrated herein. It is further understood that the terms so used are for the purposes of describing relative positions and are interchangeable under appropriate circumstances.

DETAILED DESCRIPTION OF THE DRAWINGS

A method of managing memory for a Peripheral Component Interface (PCI) bus defines a hierarchy of memory levels and memory nodes within the memory. As used herein, the term "PCI" includes the PCI standard and the CompactPCI™ standard. In particular, the memory is partitioned into a memory tree having N memory levels and different numbers of memory nodes at each of the N memory levels where N is a predetermined integer greater than 0. Each memory node at a $K^{th}$ memory level is a parent memory node and is partitioned into child memory nodes at the $(K+1)^{th}$ memory level where K is an integer greater than 0 and less than N. The descendants of a parent memory node include the child memory nodes of a parent memory node, the child memory nodes of the child memory node of the parent memory node (if any), the child memory nodes of the child memory nodes of the child memory nodes of the parent memory node (if any), and so on. The descendants of the parent memory node form a subtree in the memory tree.

In the preferred embodiment, the memory tree is binary memory tree where $2^{k-1}$ memory nodes are located at the $K^{th}$ memory level. In this binary memory tree, each memory node at the $K^{th}$ memory level has a memory size of $2^{N-K}$ units, and each parent memory node at the $K^{th}$ memory level has a pair of child memory nodes at the $(K+1)^{th}$ memory level where the child memory nodes include a right memory node and a left memory node.

FIG. 1 illustrates a representation of a memory 190 partitioned into a binary memory tree. As an example, memory 190 can be a random access memory. Memory 190 is divided or partitioned into 15 memory nodes distributed in 4 partition or memory levels. In particular, memory level 0, the lowest memory level, includes a single memory node 100; memory level 1 has memory nodes 110 and 111; memory level 2 has memory nodes 120, 121, 122, and 123; and memory level 3, the highest memory level, has memory nodes 130, 131, 132, 133, 134, 135, 136, and 137. Node 100 is the parent memory node for nodes 110 and 111, and nodes 110 and 111 are the child memory nodes of node 100. Additionally, node 110 is the parent memory node of nodes 120 and 121, and nodes 120 and 121 are the child memory nodes of node 110. Furthermore, node 121 is the parent memory node of nodes 132 and 133, and nodes 132, 133 are the child memory nodes of node 121. One skilled in the art will understand that other parent and child memory node combinations exist within memory 190.

As an example, memory 190 can have a memory size of 8 megabytes (MB). In this embodiment, node 100 has a memory size of 8 MB; nodes 110 and 111 each have memory sizes of 4 MB; nodes 120, 121, 122, and 123 each have memory sizes of 2 MB; and nodes 130, 131, 132, 133, 134, 135, 136, and 137 each have memory sizes of 1 MB. Accordingly, each node within a particular partition level has the same memory size.

Each of the nodes within memory 190 is identified by a partition index in FIG. 1. For example, nodes 100, 110, 120, and 130 each have a partition index of 0; nodes 111, 121, and 131 each have a partition index of 1; nodes 122 and 132 each have a partition index of 2; nodes 123 and 133 each have a partition index of 3; and nodes 134, 135, 136, and 137 each have partition indices of 4, 5, 6, and 7, respectively. Each of the nodes in memory 190 can be uniquely identified by its partition index and memory level.

Figure 2:
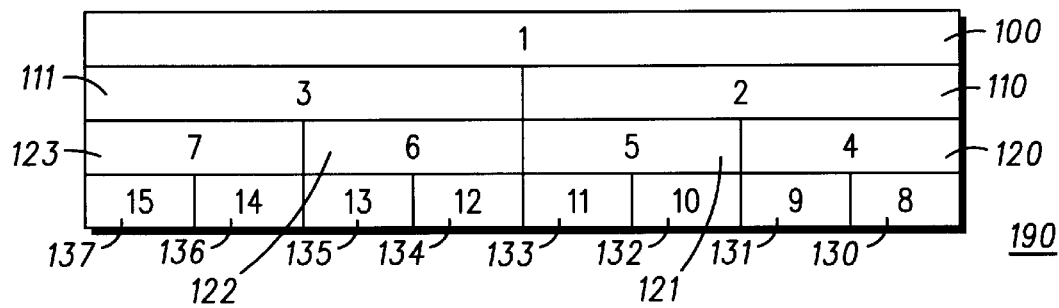
FIG. 2 illustrates the memory tree of FIG. 1 with global indices in accordance with an embodiment of the present invention.

FIG. 2 illustrates each of the memory nodes of memory 190 uniquely identified by a global index. Nodes 100, 110, 111, 120, 121, 122, 123, 130, 131, 132, 133, 134, 135, 136, and 137 have global indices of 1, 2, 3, 4, 5, 6, 7, 8, 9, 10, 11, 12, 13, 14, and 15, respectively. Using the global indices, each node within memory 190 can be uniquely identified by its global index without referencing its memory level.

Figure 3:
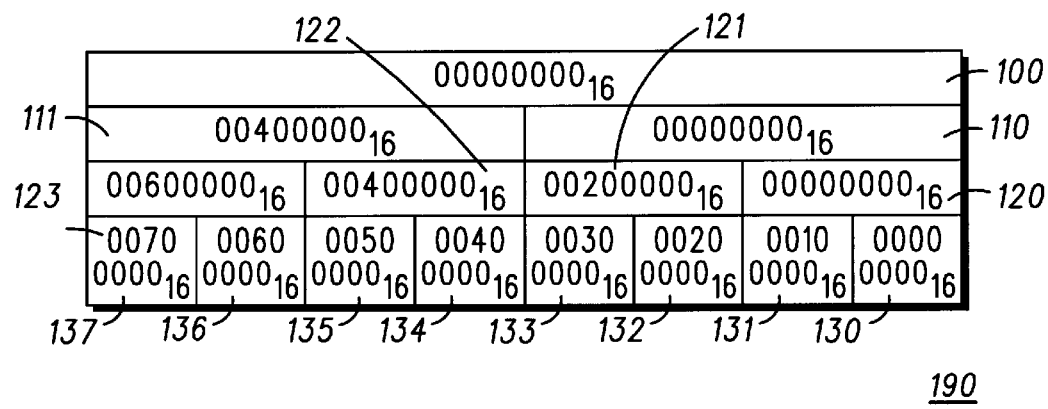
FIG. 3 illustrates the memory tree of FIG. 1 with address offsets in accordance with an embodiment of the present invention.

FIG. 3 illustrates each of the nodes in memory 190 uniquely identified by an address offset. Nodes 100, 110, 111, 120, 121, 122, 123, 130, 131, 132, 133, 134, 135, 136, and 137 are identified by hexadecimal address offsets $00000000_{16}$, $00000000_{16}$, $00400000_{16}$, $00000000_{16}$, $00200000_{16}$, $00400000_{16}$, $00600000_{16}$, $00000000_{16}$, $00100000_{16}$, $00200000_{16}$, $00300000_{16}$, $00400000_{16}$, $00500000_{16}$, $00600000_{16}$, and $00700000_{16}$, respectively. Each of the memory nodes in memory 190 is uniquely identified by its address offset without referencing its memory level.

The binary memory tree in memory 190 of FIGS. 1, 2, and 3 can be physically implemented by an array that is twice as large as the number of nodes in the highest partition level. Each cell within the array represents a memory node in memory 190 and is indexed by the global index. The first cell in the array is not used because the global index starts at 1, not 0. Each cell within the array can have a 2-bit state field to indicate the status of the descendants of the parent memory node identified by the cell in the array. The 2-bit state field can indicate that the descendants of the parent memory node are empty, full, or partially full. If the 2-bit state field indicates that the descendants are all empty, then the descendants of the parent memory node have all of their memory available to be allocated to a memory request. If the 2-bit state field indicates that the descendants are full, then the descendants of the parent memory node have already been allocated to at least one other memory request. If the 2-bit state field indicates the descendants are partially full, then some of the descendants of the parent memory node have memory available to be allocated to a memory request while other descendants of the parent memory node have already been allocated to at least one other memory request.

Navigating through the binary memory tree is preferably accomplished by using the global indices identified in FIG. 2. To access a right-hand child memory node of a parent memory node, the parent memory node's global index is multiplied by two. To access a left-hand child memory node of a parent memory node, the parent memory node's index is multiplied by two and then incremented by one. To access the parent memory node of either child memory node of the parent memory node, the child memory node's global index is divided by two using integer arithmetic where any remainder from the division is discarded.

Although navigation through the binary memory tree is accomplished using the global indices of the memory nodes in the binary memory tree, computer programs refer to the memory nodes by their absolute address and size. The absolute address is the base address of the memory tree plus the address offset within the memory tree. As indicated earlier, the address offsets of the memory nodes in the binary memory tree are illustrated in FIG. 3. One skilled in the art will understand how to generate the absolute address, which can be stored in the binary memory tree as a field within the memory node. The mathematical properties of the binary memory tree provide a convenient technique to convert between a memory node's global index and address offset. The following equations illustrate how to compute the address offset from the global index and the partition level of the memory node.

Memory Size of Memory Node=(Maximum Memory Size Of Memory Tree)/$2^{(Partition\ Level)}$     Equation 1

Partition Index=(Global Index)–$2^{(Partition\ Level)}$     Equation 2

Address Offset=(Partition Index)*(Memory Size of Memory Node)     Equation 3

The following equations illustrate how to compute the global index from the address offset and the memory size of the memory node.

Partition Index=(Address Offset)/(Memory Size of Memory Node)     Equation 4

Partition Level=1+$LOG_2$[(Maximum Memory Size of Memory Tree)/(Memory Size of Memory Node)]     Equation 5

Global Index=(Partition Index)+$2^{(Partition\ Level)}$     Equation 6

An empty subtree within the memory tree has all of its memory available. Therefore, a memory request can be allocated anywhere within the empty subtree. The weak heuristic in the memory management method requires allocating the memory request to a right-most memory node within the empty subtree. Therefore, the best solution within an empty subtree is the right-most memory node at the appropriate solution partition level. The operation to access a right subtree from a parent memory node is to multiply the parent memory node's global index by two. Therefore, computing the right-most memory node in an empty subtree is a sequence of multiplications by two. For example, if the solution partition level is one memory level deeper than the partition level of the empty parent memory node, the global index of the empty parent memory node is multiplied by two. If the solution partition level is two memory levels deeper than the empty parent memory node, then the index of the empty parent memory node is multiplied by two times two. The general equation for this computation is shown in Equation 7.

Solution Global Index = (Empty Subtree Global Index)∗ $2^{[(Solution\ Partition\ Level)-(Empty\ Subtree\ Partition\ Level)]}$     Equation 7

Initially, the memory management method sets all nodes to empty. The memory management method manages changes to the status of the memory nodes in the memory tree by propagating the state of subtrees at higher memory levels to subtrees at lower memory levels. If both subtrees from the same parent memory node are full, the subtrees from the child memory nodes of the parent memory node are also full. If both subtrees from the same parent memory nodes are empty, the subtree from the child memory nodes of the parent memory nodes are also empty. If the subtrees from the same parent memory nodes are partially full, the subtrees from the child memory nodes of the parent memory nodes may be partially full, full, or empty.

When the memory management method allocates or frees a portion of memory within the memory tree, the method propagates the change to all subtrees at lower memory levels. All subtrees of an empty subtree are marked empty, and all subtrees of a full subtree are also marked empty. Under these assumptions, the memory management method does not need to update subtrees at higher levels when allocating or freeing memory within the memory tree.

Figure 4:
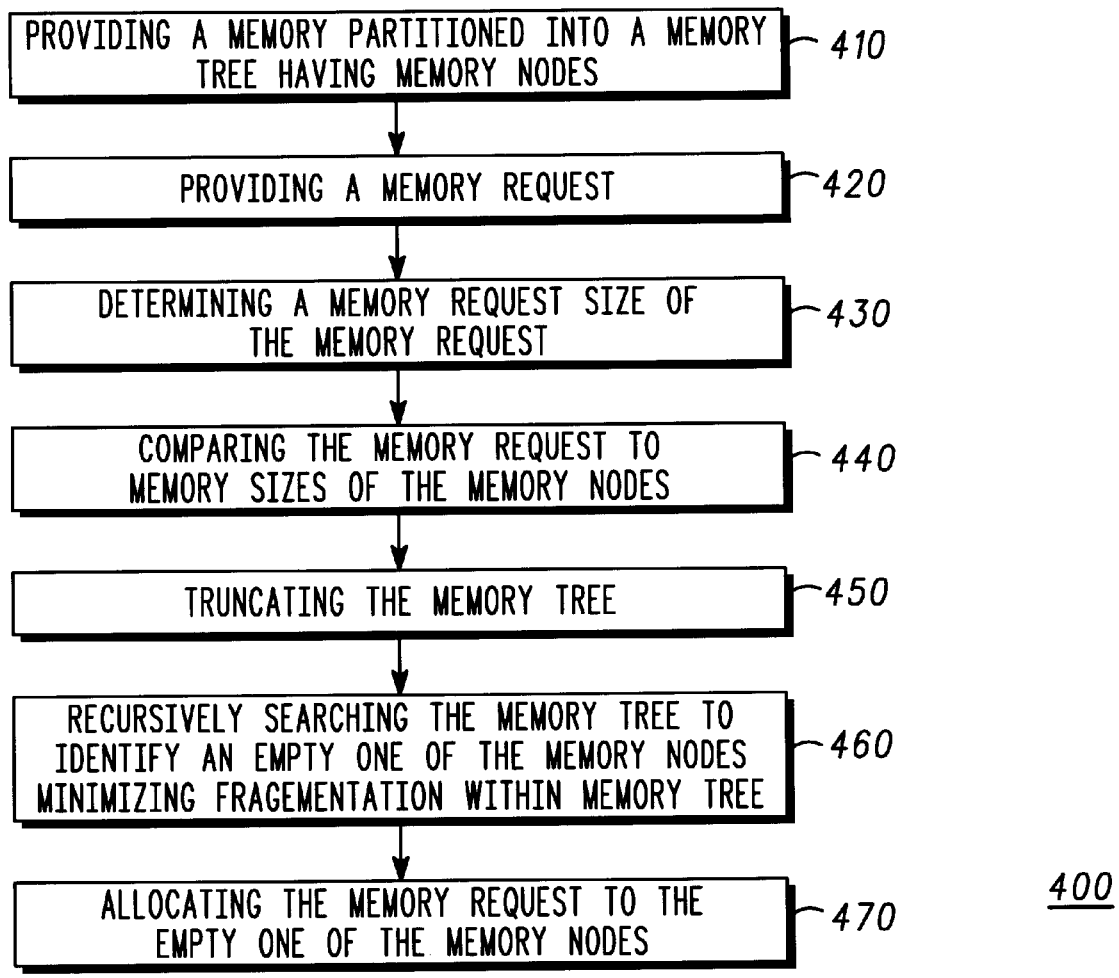
FIG. 4 illustrates a flowchart of a method of managing memory in accordance with an embodiment of the present invention.

FIG. 4 illustrates a flow chart of a method 400 of managing memory. In the preferred embodiment, method 400 allocates memory for a PCI bus or a compact PCI bus. At a step 410, a memory partitioned into a memory tree having memory nodes is provided. Preferably, all memory nodes in the memory tree are initially marked as empty. At a step 420, a memory request is provided. When a new component board is added to the bus, the board will request memory from the bus. Typically, the component board will make a plurality of memory requests. In the preferred embodiment, these memory requests are combined into a single memory request at step 420. At a step 430, the size of the memory request is determined. At a step 440, the size of the memory request is compared to the memory sizes of the memory nodes at different partition levels within the memory tree.

At a step 450, the memory tree is truncated to (N–L) memory levels where L is a non-negative integer less than N. The memory size of the memory nodes at the (N–L) memory level is greater than or equal to the memory size requested at step 420. In the preferred embodiment, the memory size of the memory nodes at the $(N-L+1)^{th}$ memory level is less than the memory size of the memory request of step 420. Next, at a step 460, the memory tree is recursively searched to identify an empty one of the memory nodes minimizing fragmentation within the memory tree. The empty one of the memory nodes is preferably located at the $(N-L)^{th}$ memory level, which represents the strong heuristic in method 400, to minimize memory fragmentation. The recursive search is performed from the first memory level through the $(N-L)^{th}$ memory level to identify the empty memory node in the $(N-L)^{th}$ memory level. This recursive search is explained in more detail hereinafter.

At a step 470, the memory request of step 420 is allocated to the empty one of the memory nodes identified in step 460. The memory request is allocated to the empty one of the memory nodes that has a score closest to a predetermined score to minimize fragmentation of the memory tree. Fragmentation occurs when the solution memory node has a parent memory node with another empty child memory node. The scoring and allocation methods are described in more detail hereinafter. If, however, an empty memory node is not found at the $(N-L)^{th}$ memory level during the recursive search of step 460, method 400 returns a fail signal and does not perform step 470.

Figure 5:
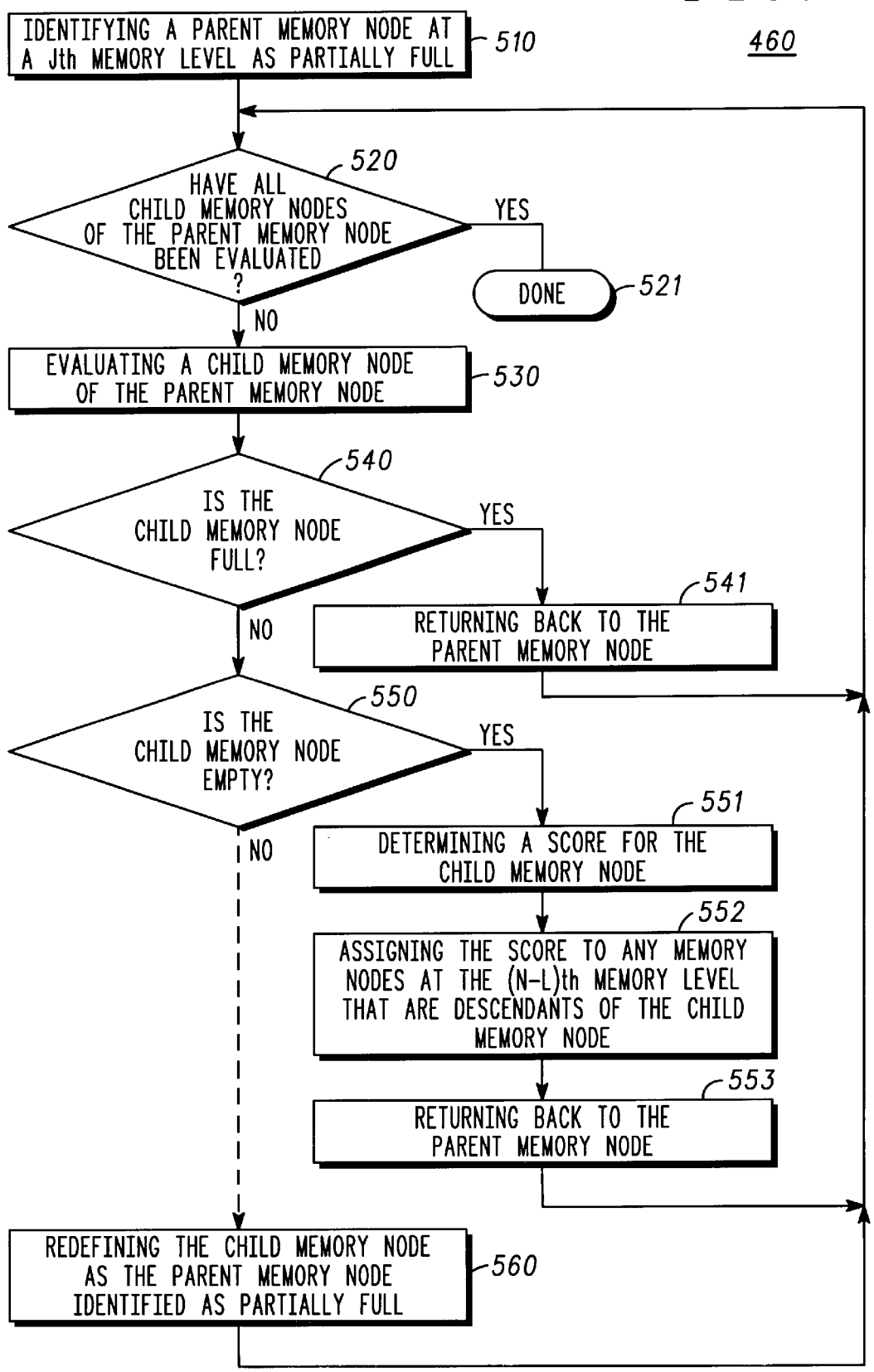
FIGS. 5 and 6 illustrate more detailed flowcharts of different portions of the method of FIG. 4 in accordance with an embodiment of the present invention.

FIG. 5 illustrates a more detailed flow chart of the recursive search in step 460 of FIG. 4. At a step 510 of FIG. 5, the recursive search identifies a partially full parent memory node at a $J^{th}$ memory level where J is a positive integer less than (N–L). At a step 520, a determination is made as to whether all child memory nodes of the parent memory node have been evaluated. If all child memory nodes have been evaluated, then step 460 is completed at step 521. If, however, step 520 determines that all child memory nodes of the parent memory node have not been evaluated, then, at step 530, a child memory node that has not yet been evaluated is evaluated. In the preferred embodiment, the weak heuristic requires the right-hand child memory node to be evaluated before the left-hand child memory node is evaluated in step 530.

At a step 540, a determination is made as to whether the child memory node is full, indicating the child memory node is already allocated to at least one other memory request. If the child memory node is full, then the recursive search returns back to the parent memory node at a step 541. In this situation, step 520 is repeated. If, however, step 540 determines the child memory node to not be full, then at a step 550, a determination is made as to whether the child memory node is empty, indicating the child memory nodes and its descendants (if any) are available to be allocated. If the child memory node is empty, a score for the child memory node is determined at a step 551.

The score for the child memory node is determined by calculating a difference between (N–L) and (J+1). A lower score represents less memory fragmentation. At a step 552, the score of the child memory node is assigned to any memory nodes at the $(N-L)^{th}$ memory level that are descendants of the child memory node. If the calculated score equals a predetermined score, then recursively searching step 460 may optionally be terminated. The predetermined score is explained in more detail in FIG. 6.

If the child memory node is located at the $(N-L)^{th}$ memory level, then-step 552 is skipped. Any memory nodes that descend from the child memory node and that are located at any memory levels between the $(N-L)^{th}$ memory level and the $(J+1)^{th}$ memory level are not evaluated and remain unscored until at least after the memory request of step 420 in FIG. 4 has been allocated in step 470 of FIG. 4. Step 551 and 552 in FIG. 5 can be performed after the recursive search of step 460 is complete. However, steps 551 and 552 are preferably performed during the recursive search of step 460, after step 550, and before step 553, as illustrated in FIG. 5. At a step 553, the recursive search returns back to the parent memory node, and step 520 is repeated.

If, however, step 550 determines the child memory node to be not empty, then the child memory node must be partially full, indicating that at least one descendant of the child memory node is empty and at least one descendant of the child memory node is full. In this case, at a step 560, the child memory node is redefined as the parent memory node, and step 520 is repeated.

Figure 6:
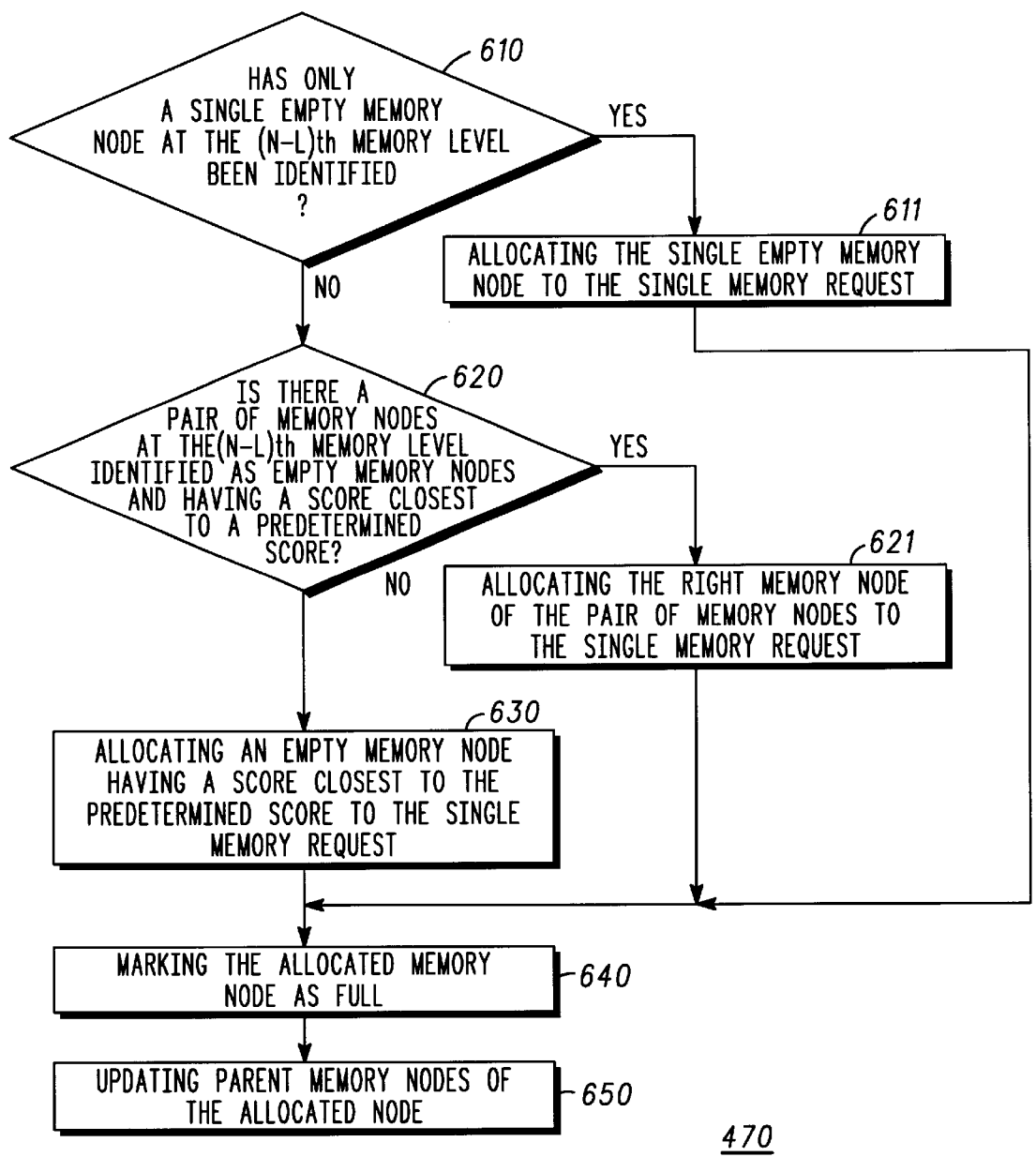

FIG. 6 illustrates a more detailed flow chart of allocating the memory request in step 470 of FIG. 4. At a step 610 in FIG. 6, a determination is made as to whether only a single empty memory node at the $(N-L)^{th}$ memory level has been identified during the recursive search of step 460 in FIG. 4. If only a single empty memory node is identified, then the memory request of step 420 in FIG. 4 is allocated to the single empty memory node at a step 611 in FIG. 6. If more than one empty memory node is identified, a determination is made as to whether there exists a plurality of empty memory nodes at the $(N-L)^{th}$ memory level that have the same score that is the closest to a predetermined score. If such a plurality exists, at a step 621, the right-most memory node of the plurality of empty memory nodes is allocated to the memory request of step 420 in FIG. 4. In the preferred embodiment, the predetermined score is zero. If such a plurality of memory nodes is not identified, then at a step 630, the empty memory node having a score closest to the predetermined score, which represents the strong heuristic, is allocated to the memory request of step 420 in FIG. 4.

After the memory request is allocated to an empty memory node, the allocated memory node is marked as full in a step 640 in FIG. 6. Then, in a step 650, all parent memory nodes of the allocated memory node are updated to be either full or partially-full. In the preferred embodiment, all child memory nodes of the allocated memory node are left as empty at least until a different component board initiates a memory request. In an alternative embodiment, all child memory nodes of the allocated memory node are marked as full.

Therefore, an improved method of managing memory is provided to overcome the disadvantages of the prior art. The method minimizes fragmentation without requiring re-booting of the computer system, and the method is compatible with different component boards requiring different sized allocations of memory. The method minimizes down time for the computer system because the system no longer needs to be taken off-line to upgrade, service, or repair different components of the computer system. Additionally, other previous memory allocations do not need to be reconfigured.

Although the invention has been described with reference to specific embodiments, it will be understood by those skilled in the art that various changes may and modifications be made without departing from the spirit or scope of the invention. For instance, the numerous details set forth herein such as, for example, the memory size of the binary memory tree, the memory levels of the binary tree memory, the index numbers associated with the binary memory tree, and the various equations associated with the index numbers are provided to facilitate the understanding of the invention and are not provided to limit the scope of the invention. Furthermore, the memory management method presented herein can also be applied to non-binary memory trees such as, for example, tertiary memory trees. Moreover, the method may be used to manage two resources with the same set of tables where the first resource uses a first weak heuristic in which the right-hand child memory node is evaluated before the left-hand child memory node and where the second resource uses a second weak heuristic in which the left-hand child memory node is evaluated before the right-handed child memory node. Accordingly, the disclosure of embodiments of the invention is intended to be illustrative of the scope of the invention and is not intended to be limiting. It is intended that the scope of the invention shall be limited only to the extent required by the appended claims.

What is claimed is:

1. A method of managing memory for a PCI bus comprising:

providing a memory partitioned into a memory tree having N memory levels and different numbers of memory nodes at each of the N memory levels;

providing a memory request;

providing $2^{K-1}$ memory nodes at the $K^{th}$ memory level wherein K is less than N;

providing a memory size of $2^{N-K}$ units for each memory node at the $K^{th}$ memory level;

determining a memory request size of the memory request;

recursively searching partially-full sub-trees within the memory tree to identify an empty one of the memory nodes minimizing fragmentation within the memory tree; and allocating the memory request to the empty one of the memory nodes.

2. A method of managing memory for a PCI bus comprising:

providing a memory partitioned into a memory tree having N memory levels and different numbers of memory nodes at each of the N memory levels;

providing a memory request;

providing a plurality of memory requests from a component;

combining the plurality of memory requests into the memory request;

marking all of the memory nodes as empty;

marking the empty one of the memory nodes as full;

updating all parent memory nodes of the empty one of the memory nodes;

leaving all child memory nodes of the empty one of the memory nodes marked as empty;

providing a second memory request from a second component after the leaving step;

determining a memory request size of the memory request;

recursively searching partially-full sub-trees within the memory tree to identify an empty one of the memory nodes minimizing fragmentation within the memory tree; and allocating the memory request to the empty one of the memory nodes.

3. A method of managing memory for a PCI bus comprising:

providing a memory partitioned into a memory tree having N memory levels and different numbers of memory nodes at each of the N memory levels;

providing a memory request;

determining a memory request size of the memory request;

recursively searching partially-full sub-trees within the memory tree to identify an empty one of the memory nodes minimizing fragmentation within the memory tree;

allocating the memory request to the empty one of the memory nodes;

marking the empty one of the memory nodes as full;

updating all parent memory nodes of the empty one of the memory nodes; and marking all child memory nodes of the empty one of the memory nodes as full.

4. A method of managing memory for a PCI bus comprising:

providing a memory partitioned into a memory tree having N memory levels and different numbers of memory nodes at each of the N memory levels;

providing a memory request;

truncating the memory tree to (N–L) memory levels wherein L is less than N;

determining a memory request size of the memory request;

recursively searching partially-full sub-trees within the memory tree to identify an empty one of the memory nodes minimizing fragmentation within the memory tree;

allocating the memory request to the empty one of the memory nodes; and providing a right-most empty memory node in the binary memory tree for the empty one of the memory nodes wherein the right-most empty at the $(N-L)^{th}$ memory level, wherein the memory size of the memory nodes at the $(N-L)^{th}$ memory level is greater than or equal to the memory request size, and wherein the memory request size of the memory nodes at the $(N-L+1)^{th}$ memory level is less than the memory request size.

5. A method of managing memory for a PCI bus comprising:

providing a memory partitioned into a memory tree having N memory levels and different numbers of memory nodes at each of the N memory levels;

providing a memory request;

truncating the memory tree to (N−L) memory levels wherein L is less than N;

determining a memory request size of the memory request;

providing the memory size of the memory nodes at the (N−L)$^{th}$ memory level to be greater than or equal to the memory request size;

recursively searching partially-full sub-trees within the memory tree to identify an empty one of the memory nodes minimizing fragmentation within the memory tree; and allocating the memory request to the empty one of the memory nodes.

6. A method of managing memory for a PCI bus comprising:

providing a memory partitioned into a memory tree having N memory levels and different numbers of memory nodes at each of the N memory levels;

providing a memory request;

truncating the memory tree to (N−L) memory levels wherein L is less than N;

determining a memory request size of the memory request;

providing the memory size of the memory nodes at the (N−L+1)$^{th}$ memory level to be less than the memory request size;

recursively searching partially-full sub-trees within the memory tree to identify an empty one of the memory nodes minimizing fragmentation within the memory tree; and allocating the memory request to the empty one of the memory nodes.

7. A method of managing memory for a PCI bus comprising:

providing a memory partitioned into a memory tree having N memory levels and different numbers of memory nodes at each of the N memory levels;

providing a memory request;

truncating the memory tree to (N−L) memory levels wherein L is less than N;

determining a memory request size of the memory request;

recursively searching partially-full sub-trees within the memory tree to identify an empty one of the memory nodes minimizing fragmentation within the memory tree;

allocating the memory request to the empty one of the memory nodes and providing the empty one of the memory nodes at the (N−L)$^{th}$ memory level.

8. A method of managing memory for a PCI bus comprising:

providing a memory partitioned into a memory tree having N memory levels and different numbers of memory nodes at each of the N memory levels;

providing a memory request;

truncating the memory tree to (N−L) memory levels wherein L is less than N;

identifying memory nodes at a K$^{th}$ memory level as parent memory nodes wherein K is less than N;

providing the parent memory nodes at any K$^{th}$ memory level with child memory nodes at the (K+1)$^{th}$ memory level;

determining a memory request size of the memory request;

recursively searching partially-full sub-trees within the memory tree to identify an empty one of the memory nodes minimizing fragmentation within the memory tree; and allocating the memory request to the empty one of the memory nodes.

9. The method of claim 8 wherein the recursively searching step further comprises:

identifying a parent memory node at a J$^{th}$ memory level as partially full wherein J is less than (N−L);

evaluating a child memory node of the parent memory node identified as partially full;

if the child memory node is evaluated to be full, returning back to the parent memory node identified as partially full;

if the child memory node is evaluated to be empty:
determining a score for the child memory node by calculating a difference between (N−L) and (J+1);
assigning the score to any memory nodes at the (N−L)$^{th}$ memory level that are descendants of the child memory node; and
returning back to the parent memory node identified as partially full; and if the child memory node is evaluated to be partially full, redefining the child memory node as the parent memory node identified as partially full.

10. The method of claim 9 further comprising:

returning a fail signal if the empty one of the memory nodes is not found at the (N−L)$^{th}$ memory level.

11. The method of claim 9 further comprising:

avoiding evaluations of memory nodes that descend from the child memory node evaluated to be empty and that are located at memory levels between the (N−L)$^{th}$ memory level and the (J+1)$^{th}$ memory level.

12. The method of claim 9 further comprising:

determining the score for the child memory node evaluated to be empty before returning back to the parent memory node identified as partially full.

13. The method of claim 9 wherein:

providing the parent memory nodes further comprises:
providing a right memory node and a left memory node for the child memory nodes; and evaluating the child memory node further comprises:
evaluating the right memory node before evaluating the left memory node.

14. The method of claim 13 wherein the recursively searching step further comprises:

terminating the recursively searching step upon finding one of the memory nodes with a predetermined score.

15. The method of claim 8 wherein:

providing the parent memory nodes further comprises:
providing a right memory node and a left memory node for the child memory nodes; and allocating the memory request further comprises:
if the recursively searching step identifies a single empty memory node at the (N−L)$^{th}$ memory level, allocating the single empty memory node to the single memory request;
if the recursively searching step identifies a plurality of empty memory nodes located at the (N−L)$^{th}$ memory level and having different scores, allocating one of the plurality of empty memory nodes having a score closest to a predetermined score to the single memory request; and if the recursively searching step identifies a plurality of memory nodes at the $(N-L)^{th}$ memory level as being empty and if each memory node in the plurality of memory nodes has the score closest to the predetermined score, allocating the right-most memory node of the plurality of memory nodes to the single memory request.

16. The method of claim 15 further comprising:

providing zero for the predetermined score.

17. The method of claim 15 wherein allocating the one of the plurality of empty memory nodes having the score closest to the predetermined score to the single memory request further comprises:

allocating the one of the plurality of empty memory nodes having the score closest to the predetermined score to the single memory request in order to minimize fragmentation of the memory tree.

18. A method of dynamically managing memory for a compact PCI bus comprising:

providing a memory partitioned into a binary memory tree having N memory levels and $2^{K-1}$ memory nodes at the $K^{th}$ memory level wherein N is a predetermined integer greater than zero, wherein K is an integer greater than zero and less than N, wherein each memory node at the $K^{th}$ memory level is a parent memory node and is partitioned into a pair of child memory nodes at the $(K+1)^{th}$ memory level, wherein each pair of child memory nodes is comprised of a right memory node and a left memory node, and wherein each of the memory nodes at the $K^{th}$ memory level has a memory size of $2^{N-K}$ units;

combining a plurality of memory requests from a component into a single memory request;

determining a single memory size of the single memory request;

comparing the single memory size to the memory sizes of the memory nodes at the N memory levels;

truncating the binary memory tree to (N–L) memory levels wherein L is a non-negative integer less than N, wherein the memory size of the memory nodes at the $(N-L)^{th}$ memory level is greater than or equal to the single memory size, and wherein the memory size of the memory nodes at the $(N-L+1)^{th}$ memory level is less than the single memory size;

recursively searching the binary memory tree from the first memory level through the $(N-L)^{th}$ memory level to identify empty memory nodes in the (N–L) memory level by:

identifying a partially-full parent memory node at a $J^{th}$ memory level wherein J is a positive integer less than (N–L);

evaluating a child memory node of the partially-full parent memory node;

if the child memory node is evaluated to be full:

returning back to the partially-full parent memory node; and repeating the evaluating step;

if the child memory node is evaluated to be empty:

determining a score for the child memory node by calculating a difference between (N–L) and (J+1);

assigning the score to any memory nodes at the $(N-L)^{th}$ memory level that are descendants of the child memory node;

returning back to the partially-full parent memory node; and repeating the evaluating step;

if the child memory node is evaluated to be partially full:

redefining the child memory node as the partially-full parent memory node; and repeating the evaluating step;

if no empty memory nodes at the $(N-L)^{th}$ memory level are identified, returning a fail signal;

if only a single empty memory node at the $(N-L)^{th}$ memory level is identified, allocating the single empty memory node to the single memory request;

if empty memory nodes at the $(N-L)^{th}$ memory level are identified and have different scores, allocating an empty memory node having a score closest to a predetermined score to the single memory request; and if a plurality of memory nodes at the $(N-L)^{th}$ memory level are identified as empty memory nodes and if each memory node in the pair has the score closest to the predetermined score, allocating the right-most memory node of the plurality of memory nodes to the single memory request.

19. The method of claim 18 further comprising:

avoiding evaluations of memory nodes that descend from the child memory node evaluated to be empty and that are located at memory levels between the $(N-L)^{th}$ memory level and the $(J+1)^{th}$ memory level.

20. The method of claim 18 further comprising:

marking the memory node allocated to the single memory request as full; and updating all parent memory nodes of the memory node allocated to the single memory request.

21. The method of claim 20 further comprising:

marking all of the memory nodes as empty before comparing the single memory size;

leaving all child memory nodes of the memory node allocated to the single memory request marked as empty after marking the memory node allocated to the single memory request as full; and providing a second memory request from a second component after the leaving step.

22. The method of claim 20 further comprising:

marking all child memory nodes of the memory node allocated to the single memory request as full.

23. The method of claim 18 further comprising:

determining the score for the child memory node evaluated to be empty before returning back to the partially-full parent memory node.

24. The method of claim 18 wherein evaluating a child memory node further comprises:

evaluating the right memory node before evaluating the left memory node.

25. The method of claim 18 further comprising:

providing zero for the predetermined score.

26. The method of claim 18 wherein allocating the empty memory node having the score closest to the predetermined score to the single memory request further comprises:

allocating the empty memory node having the score closest to the predetermined score to the single memory request in order to minimize fragmentation of the binary memory tree.

* * * * *